UNITED STATES PATENT OFFICE.

WLADYSLAW T. KOSINSKI, OF PHILADELPHIA, PENNSYLVANIA.

IMPROVEMENT IN COATINGS FOR STEAM-PIPES, BOILERS, &c.

Specification forming part of Letters Patent No. 107,387, dated September 13, 1870.

*To all whom it may concern:*

Be it known that I, WLADYSLAW T. KOSINSKI, of Philadelphia city, State of Pennsylvania, have invented certain Improvements in a composition of matter in the nature of plaster-cement, for the purpose of producing a porous, plastic, and non-conducting covering of the surface or surfaces of any body or vessel or utensil, wherein it is desirable to maintain an even uniform temperature, or to bodies wherein it may be desirable to retain, or from which it may be desirable to exclude, the heat, such as steam-pipes, or boilers, hot or cold water-pipes, tanks, vats, furnaces, &c., where any of the aforesaid objects may be of any importance.

The first part of my invention relates to the preparation of the surface of said above bodies for the adhesion of the cement, by way of application of a sort of paint of my own invention, composed according to the requirement, of tar, or boiled oil, or gums, or resinous matter, dissolved in volatile oil, with crushed asbestus.

Said paint, beside being necessarily preparatory to the application and adhesion of the cement, prevents the rust and oxidation of the metal of which the vessels or utensils may be made.

The second part of my invention relates to the composition of cement proper, which I called felt cement, and which gives a collective name to both parts of my invention.

The ingredients or elements employed in compounding my said cement are, two parts clay, two parts ground bricks, one part ground bituminous coal, two parts of bran, one part hard pitch, and one-fourth part of animal hair. These constituents I mix together in a dry state; and when well mixed I unite them by adding water to a consistency of a paste.

These proportions may be somewhat modified without materially altering the result, but thus far I have found the proportion here given to give the best satisfaction.

In compounding this cement, horse or cattle droppings may be substituted for bran, or bran with horse or cattle excrements mixed, or any similar substances be used as substitute for either, but when either of these substances is used, it should be in about the proportion above given.

The ground resin or asphaltum may be used as a substitute for hard pitch, as well as other resinous or gummy substances in the indicated above proportions.

Further, in place of hair or waste wool, some other fibrous substances may be used, such as jute, cotton, or indeed any strong fiber, which will aid in holding the cement together. Instead of ground bricks ashes may be substituted.

The cement thus made and compounded is more especially applicable to the covering of steam-boilers or steam-pipes, or other bodies liable to be heated, where the object is to avoid radiation of heat, and thus economize in the consumption of fuel.

Thus prepared, cement is applied to the surface as a paste or plaster, then may be covered, or not covered, with a thin cloth or canvas, according to convenience, or even painted, if desired.

The heat of the boiler or other body bakes and dries the cement into a non-conducting compact mass upon the surface of the covered body.

When this composition is to be used to cover a cold surface of cold-water pipes, refrigerators, &c., and the like, then the cement is put into molds, baked and dried into required form for use.

I claim, then, and desire to secure by Letters Patent as my invention—

The ingredients and proportions of my felt-cement, with the ground paint, preventing oxidation, and preparing the surface of the bodies, to cause to adhere and hold the said felt-cement for covering steam-boilers, steam-pipes, hot or cold water-pipes, refrigerators, &c.

W. T. KOSINSKI.

Witnesses:
HENRY KALUSSOWSKI,
JOHN H. JOHNSON.